April 19, 1966    B. KAZAN    3,247,389
ELECTROLUMINESCENT DEVICE FOR PRODUCING IMAGES
Filed Oct. 20, 1952    2 Sheets-Sheet 1
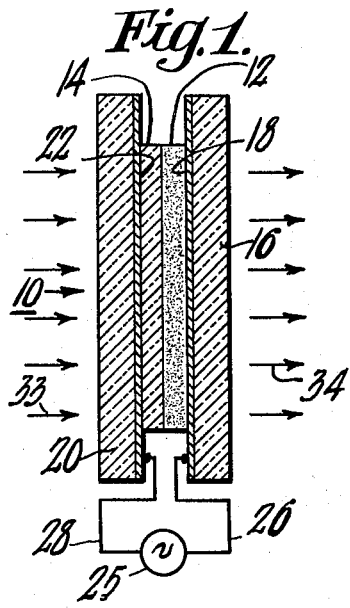
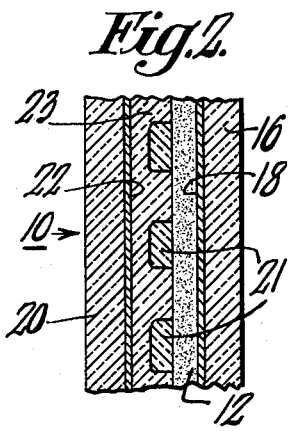
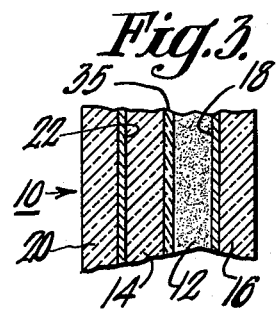
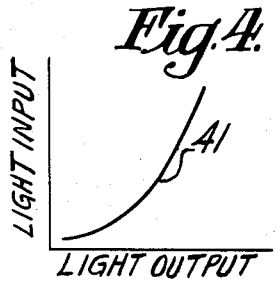
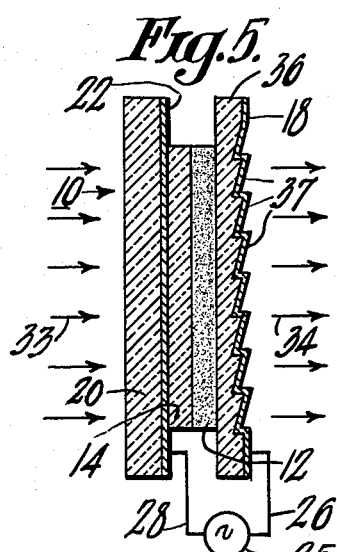
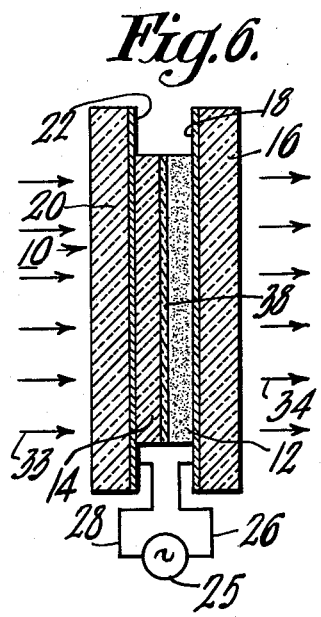
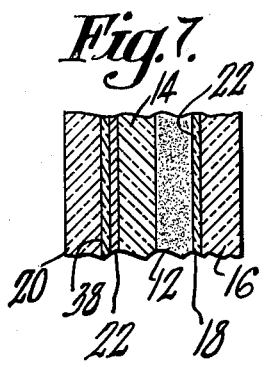
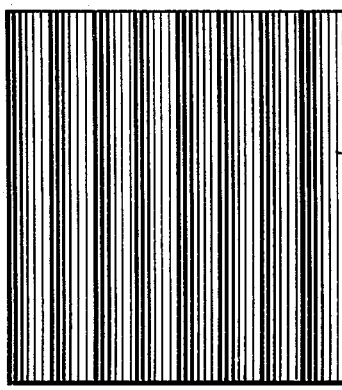
INVENTOR.
BENJAMIN KAZAN
BY William A. Zabriskie
ATTORNEY

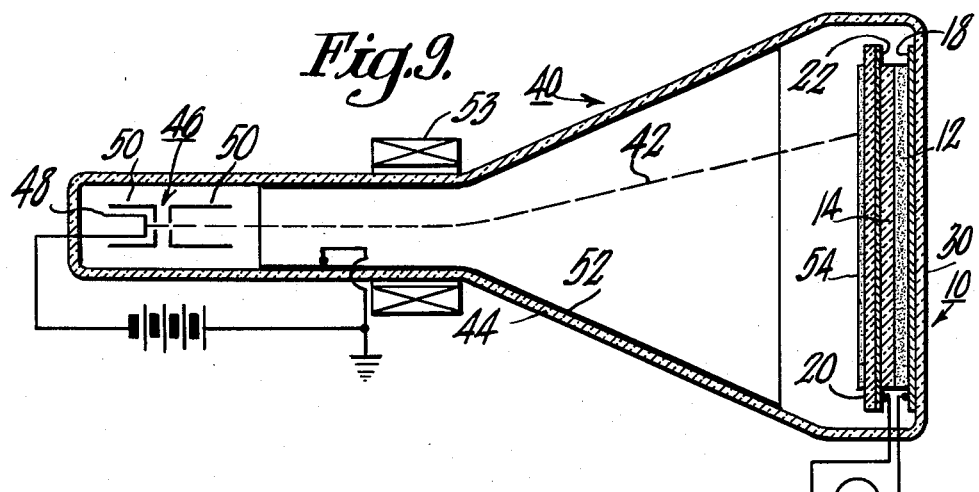
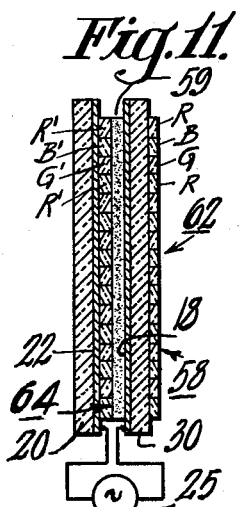
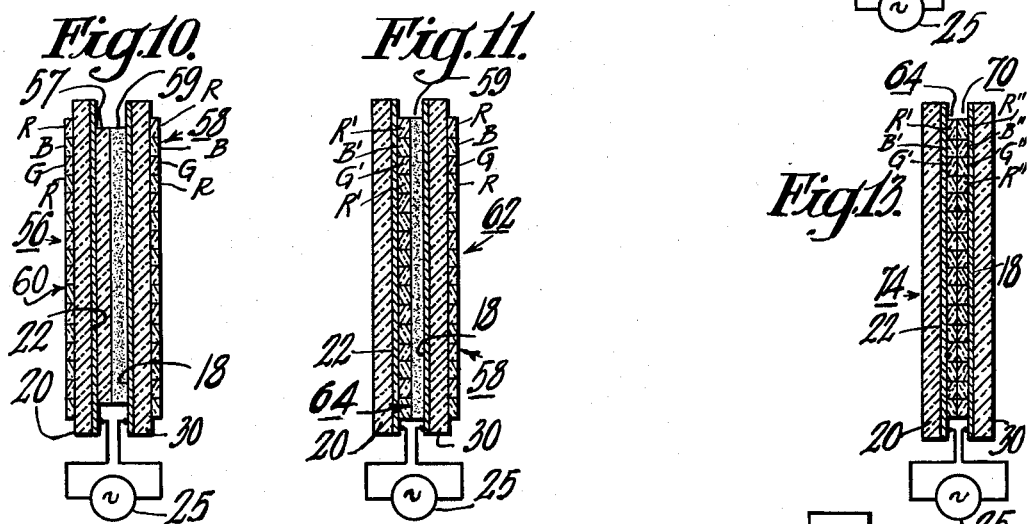
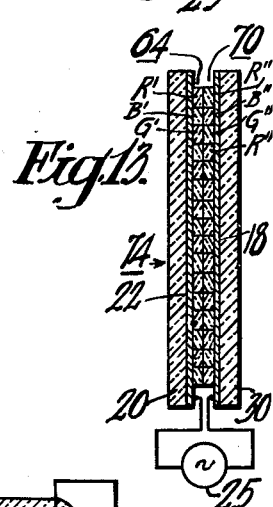
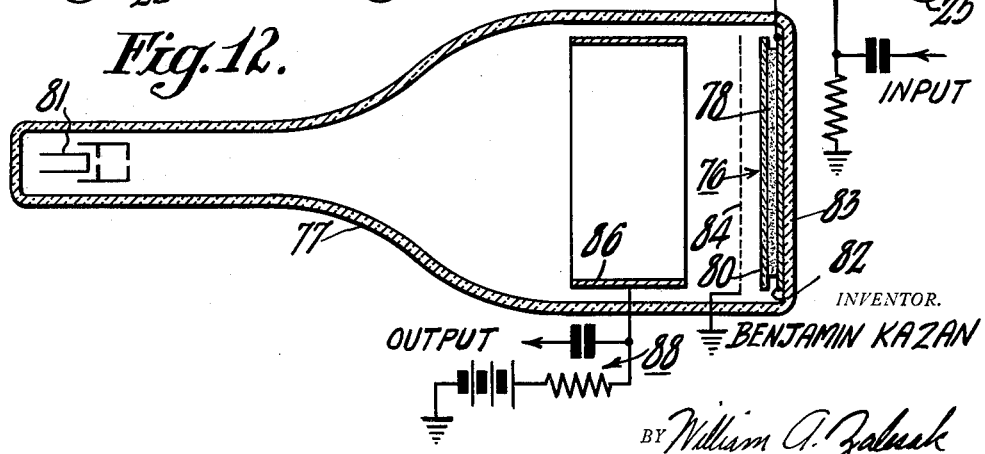

United States Patent Office 3,247,389
Patented Apr. 19, 1966

3,247,389
ELECTROLUMINESCENT DEVICE FOR PRODUCING IMAGES
Benjamin Kazan, Princeton, N.J., assignor to Radio Corporation of America, a corporation of Delaware
Filed Oct. 20, 1952, Ser. No. 315,694
20 Claims. (Cl. 250—213)

This invention relates to devices for producing light or light images or other radiation by subjecting an electroluminescent body to a varying electric field. In particular, the invention relates to such devices for producing light or other radiant energy representative of an energizing influence which may be light or other radiant energy, electrical signals, an electrical charge pattern, particle radiation, or the like. The invention further relates to light amplifiers and light storage devices. This invention contemplates the provision of devices for use in promoting the production, amplification, and storage of light signals by an electroluminescent body under the energizing influence of a member whose impedance is a function of incident radiant energy or electrical energy.

It is known in the electronic arts that some luminescent phosphor materials can be made to produce light by the application of an electric field across a body of one of these materials. This phenomenon is known as electroluminescence and these materials are known as electroluminescent phosphors. The theory of electroluminescence is not well understood, and several theories of operation are in force at present. One of these is the Field Emission theory. According to this theory, an electric field exists across the region between particles of phosphor in the electroluminescent body. If this field is sufficiently strong, electrons may be drawn out of one particle and across the separating gap toward the opposing particle which is thus bombarded in a manner similar to the usual electron bombardment of a phosphor screen. Under this electron bombardment, the phosphor particles are induced to give off light.

Another theory is that electrons are retained in shallow traps within a phosphor particle. These electrons may be drawn out of the traps by an electric field, accelerated and caused to energize other particles, thereby producing light.

There are devices presently known which may be used to produce light images in response to an energizing force of one kind or another. Electrical storage devices are also well known in the art. However such known devices have the disadvantages of being complicated, have critical structural relationships, and are expensive and difficult to manufacture.

Accordingly, the principal object of this invention is to provide a device capable of producing and storing light images by subjecting an electroluminescent body to an electric field.

A further object is to provide an improved and simplified electronic device for use in producing, storing, and amplifying light images.

A further object of this invention is to provide an improved electro-optical device for use in converting an electrical charge pattern to a visual light image.

Another object is to provide an improved light storage and light amplifying device which is comparatively inexpensive and is easy to manufacture.

In general, the purposes and objects of this invention are accomplished by the provision of an electroluminescent body, means for establishing an electric field across the body and further means for varying the electric field across the body. In particular one embodiment of this invention contemplates the use of a sheet of photoconductive material, or other material whose impedance can be varied by an external force, in conjunction with a sheet or layer of electroluminescent material. An electric field is established across this composite device. The impedance of the photoconductor is varied by incident radiant energy with the result that the field across the electroluminescent layer is varied correspondingly. This variation in field produces a variation in light output. In an alternative arrangement, the photoconductor is replaced by a sheet of insulating material capable of assuming an electrical charge pattern. In this embodiment, a fixed potential on the insulating sheet co-acting with a varying potential on a conductive plate associated with the electroluminescent layer produces luminescent light representative of the signals producing these potentials. The fixed potential may be produced by a scanning electron beam.

The invention is described with reference to the drawings wherein:

FIG. 1 is a sectional view of an electroluminescent device of the invention;

FIG. 2 is an enlarged sectional view of a portion of a modification of the device shown in FIG. 1;

FIG. 3 is an enlarged view of a portion of a modification of the device shown in FIG. 1;

FIG. 4 is a curve showing the desired characteristic for the components of the device of the invention;

FIG. 5 is a sectional view of a modification of the device shown in FIG. 1;

FIG. 6 is a sectional view of a further modification of the invention;

FIG. 7 is an enlarged section of a portion of a modification of the device shown in FIG. 6;

FIG. 8 is an elevation view of a variable density filter employed with the invention;

FIG. 9 is a longitudinal view, partly in section, of an apparatus embodying a modification of the invention;

FIG. 10 is another modification of the invention;

FIG. 11 is a modification of the invention shown in FIG. 10; and

FIG. 12 is a longitudinal view, partly in section, of another apparatus employing a modification of the invention.

One form of the invention is shown in FIG. 1 in a device designated by the numeral 10. The device 10 comprises a sandwich or laminated structure including an electroluminescent layer 12 and an adjacent photoconductive layer 14. More specifically, the sandwich 10 includes on one side a transparent base member 16 which may be glass, having deposited thereon a transparent conductive coating 18. On the other side, there is employed a similar glass base member 20 also coated on its inside surface with a transparent conductive coating 22. The layer 12 and photoconductive layer 14 are sandwiched between the members 16 and 20 and are in contact with each other and the conductive layers 18, 22.

As to the materials of which the electroluminescent device or cell 10 is composed, the layer 12 may comprise many of the common phosphors such as copper activated zinc sulfide and the like depending on the desired color output. In preparing the layer or sheet, the particles of phosphor material are mixed with or embedded in a light transmitting insulating material, for example a plastic, lacquer, wax or the like. According to one method of preparing the electroluminescent body, a unit quanity of a plastic matrix material for the phosphor was prepared with the following ingredients in approxmiately the given quantities:

|  | Grams |
| --- | --- |
| Ethyl cellulose | 1.2 |
| Iso-amyl alcohol | 16.5 |
| Amyl acetate | 25.5 |
| Acetone | 14.5 |
| Di-octyl phthalate | 1.5 |
| Octyl acetate | 1.0 |

This mixture was blended with approximately two grams of finely divided phosphor particles, for example copper activated zinc sulfide particles, having a diameter of the order of one to five microns. The mixture of plastic and phosphor was then ball-milled for approximately one hour. Finally the milled preparation was sprayed onto a suitable base plate, for example the plate 16. In a device actually built, the thickness of this layer was of the order of 1 to 3 mils.

The photoconductive layer 14 may be made of any photoconductive material sensitive to the type of radiation to be employed in activating the layer and may be made in a manner similar to that described above for the electroluminescent layer. The radiation may be visible light, ultra-violet, infra-red, X-ray radiation or particle radiation such as that produced by radioactive materials. The photoconductor may be antimony trisulfide, selenium or the like. The photoconductive layer may have a thickness comparable to that of the electroluminescent layer; and in the aforementioned constructed device, such a comparable relationship existed. The relative thicknesses of these layers is determined by the types of materials used and the desired voltage drop across each layer when the electroluminescent device 10 is in the unenergized or reference condition.

Depending on the use to which the electroluminescent device or sandwich is to be put, the conductive layers 18, 22 may one or both be constituted of metal plates or sheets or films of material adapted to be transparent to the type of radiation to be employed in operation of the electroluminescent device. One method of forming these layers is to apply transparent conductive material to the base plates 16, 20 having the desired radiation transmitting qualities. The transparent conductive material may be of the type formed by deposition of the vapors of stannic chloride, water and methanol.

In operation of the device 10 a source of voltage 25 preferably alternating is applied across the photoconductive layer 14 and electroluminescent layer 12 through the leads 26, 28 connected to the conductive films 18, 22. The frequency of the voltage utilized depends on the materials used and the light output desired and may range from 60 cycles to frequencies in the megacycles. When alternating voltage is applied to an electroluminescent device, there are two bursts of light during each voltage cycle. Thus, for the particular materials employed for the device, the frequency of the voltage must be at least sufficiently high so that the individual bursts of light cannot be seen by the eye. The magnitude of the voltage depends on the thickness of the cell and desired light output and may, for example, be between 200 and 1000 volts. The device is designed so that, in the unenergized condition, i.e. in the absence of incident radiation, the impedance of the photoconductive layer 14 is considerably higher than that of the electroluminescent layer 12 so that a greater portion of the voltage drop appears across the former and the portion of the voltage across the latter is insufficient to produce appreciable luminescence. The ratio of the impedances of the layers at any particular source frequency to be used can be controlled by proper design of the thicknesses of the two layers for the types of materials used.

After the proper voltage 25 has been applied, radiation 33 from an object or other source is focused on the photoconductive layer 14 through the glass sheet 20 which is selected for its ability to transmit the incident radiation. When this radiation strikes the photoconductive layer 14, that layer becomes conductive across elemental regions thereof in an amount more or less proportional to the incident radiation on the areas of each of said elemental regions exposed to the radiation 33. As a result of this increased conductivity of the photoconductive layer, each elemental region of the electroluminescent layer 12 has correspondingly more of the alternating voltage applied across it. With increased voltage across each elemental region, each such region emits radiation 34 which is an amplified image of the radiation 33. Since the electroluminescent device 10 is comparatively thin, light emitted from an area of the layer 12 represents radiation striking the corresponding area of the photoconductive layer 14.

In some instances where a multi-element light image is being reproduced, a problem may arise due to dilution as a result of spreading of the area of energization of the photoconductive layer. To counteract this problem, the photoconductive layer may be divided into sub-elemental regions 21 separated by transparent insulating material 23 as shown in FIG. 2. Such a construction may be effected, for example, by evaporating or spraying the photoconductive material through a fine mesh screen and then applying the coating of insulating material or by any other suitable method. Alternatively, the electroluminescent layer may be insulatingly subdivided in this manner.

One advantageous feature of this invention results from the fact that light originating in the layer 12 may be emitted not only through the glass plate 16 but also back toward the photoconductive layer 14 which may be re-excited thereby. This result is achieved if the photoconductive layer is sensitive to the color of the light emitted by the electroluminescent layer. Such feeding back of light may be utilized to (1) enhance the amplifying or intensifying power of the device or it may be used (2) to provide a "holding" or storage action if the feedback exceeds a certain minimum. The result achieved depends on the construction of the device, the characteristics of the constituent materials of the device, and the intensity of the incident light.

Enhanced amplification means that, while incident energy is being received, the feedback from elemental regions of the electroluminescent layer is sufficient to increase the conductivity of elemental regions of the photoconductive layer and to increase the light output from elemental regions of the electroluminescent layer. Holding or storage occurs when light from elemental regions of the electroluminescent layer which feeds back to elemental regions of the photoconductive layer exceeds the amount of incident radiant energy and the photoconductive layer is driven to saturation. Under this condition, the electroluminescent layer continues to emit light 34 after the incident energy 33 is cut off.

In connection with the feature of amplification or holding, an insulating layer 35 (FIG. 3) may be employed between the photoconductive and electroluminescent layers 14, 12 respectively. This insulating layer performs several functions. By separating the photoconductive and electroluminescent layers, it permits ease in fabrication of the laminated structure in instances where, for example, the constituent materials of the two layers might contaminate each other. The degree of transparency or opacity of the insulating layer determines the amount of feedback and the resultant light intensification or level at which holding results. In addition, the insulating layer can be adapted to prevent or allow radiation incident on the photoconductor from reaching and penetrating through the electroluminescent layer directly. In certain instances, e.g. where optical equipment is employed with the electroluminescent device, it may or may not be undesirable to expose such equipment to penetrating incident radiation.

As described above, if elemental regions of an electroluminescent device of the type described above are illuminated above a certain minimum value, these elements will "hold" or continue to emit light after incident radiation has been cut off. If the incident radiation is below this minimum, there is enhanced amplification while there is incident energization, however, there is no light output when the incident energy is cut off. Thus a stored or "held" picture or pattern consists of either bright or dark elements and possesses no half-tones.

However, half-tone images may be produced by the devices described below.

In order to be able to hold a half-tone picture, the device should have such characteristics that holding does not occur until the incident energy attains a certain minimum value below which each elemental region of the device may enhance its light output but not hold its portion of the image. To achieve the above-mentioned operating characteristics, the device should include either an electroluminescent layer whose light output varies exponentially with incident light or a photoconductive layer whose photoconductivity varies exponentially with incident light or both. The foregoing exponential relationships are such that the characteristic curve relating output and input for the constituent materials is concave upward as shown in FIG. 4. In the curve shown in FIG. 4, the point 41 may be the minimum point below which only enhanced amplification results and above which holding results.

One such device is shown in FIG. 5 wherein a transparent dielectric sheet 36 of glass or the like having repeating portions 37 of regularly varying thickness is provided in the electroluminescent sandwich 10 in place of the glass member 16 shown in FIG. 1. The variations 37 in such a sheet are as numerous as possible, and preferably, are smaller than an elemental picture area. This variable thickness sheet 36 may be inserted adjacent to either conductive film 18 or 22 or between the electroluminescent and photoconductive layers 14 and 12 respectively. The structure of this dielectric sheet 36 causes variations in voltage drop from point to point along its surface and corresponding variations in voltage from point to point across the photoconductive and electroluminescent layers. Such elemental voltage variations across the photoconductive and electroluminescent layers result in corresponding variations in the minimum level of incident light necessary to cause holding or storage at each elemental region of the device.

Thus, low light level incident picture elements cause holding only at the thinnest portions of the dielectric sheet because only at these portions are the electroluminescent and photoconductive layers energized sufficiently to raise them above the minimum point 41 (FIG. 4) and to initiate the feedback cycle which brings the photoconductive layer to saturation. Incident picture elements of greater intensity cause holding at thicker portions of the dielectric and so forth. In this manner, a half-tone holding or storage action can be achieved by a variation in the areas of the device which are energized sufficiently to cause holding action and sustained light emission after removal of the incident light.

The same principle of half-tone storage is applied in the embodiment of the invention shown in FIG. 6 wherein a variable density light filter 38 is inserted between the photoconductive and electroluminescent layers 14 and 12. The variable density filter is shown in elevation in FIG. 8 and comprises a thin insulating sheet of plastic or the like having regularly recurring regions of variable opacity to the wavelength of radiation to be transmitted. These recurring regions are preferably of sub-elemental width and may be prepared by a photo-engraving process. One such process might be carried out by coating the plastic with a photographic emulsion and exposing the emulsion by passing right through a properly lined negative. The amount of light passed would vary with each line in an elemental group and would be the same for corresponding lines in each group. The filter 38 allows a varying amount of electroluminescent light to feed back to the photoconductive layer 14. This embodiment operates similarly to the embodiment shown in FIG. 5 and elemental regions of the device require different amounts of energization to cause holding depending on the density of the filter 38 at each such region. The variable density filter 38 may also be placed in front of the photoconductive layer 14 (FIG. 8) in the path of the incident radiation, as shown in FIG. 7.

Other schemes for producing half-tone storage can be provided, for example, by substituting a variable resistance sheet in place of the variable thickness dielectric sheet 36 of FIG. 5 or my producing dielectric or resistive sheets with random, but small, variations of thickness or resistance, respectively.

The electroluminescent member or device described above may be employed in another embodiment of the invention in electro-optical apparatus such as a cathode ray tube as shown in FIG. 9. In this embodiment, the electroluminescent device 10 is adapted to be energized by an incident electron beam 42 rather than by the incident radiation 33 described above. This embodiment of the invention comprises a cathode ray tube 40 having the usual envelope 44 and the usual electron gun 46 including a cathode 48 and a suitable number of control electrodes 50. The inner surface of the envelope is provided with the usual conductive coating 52. A deflection yoke 53 is also provided. The electroluminescent device 10 described above is provided with a layer or screen 54 of electron excitable luminescent phosphor material over the glass plate 20 adjacent to the photoconductive layer 14. The glass plate 30 adjacent to the layer 12 may comprise the face plate of the envelope 44. An opaque layer, such as the layer 35 (FIG. 3) may be provided between the photoconductive layer 14 and the layer 12 if it is desired to control or prevent regeneration and storage. The alternating voltage source 25 of the desired frequency and amplitude for the materials employed is connected across the electroluminescent device 10.

In the operation of this embodiment of the invention the modulated scanning electron beam 42 scans the phosphor layer 54 which is thereby excited to emit radiation of either visible light, ultra-violet light or the like depending on its characteristics.

The amount of light emitted by the phosphor 54 depends on the energy of the electron beam as it strikes each elemental area thereof. The scanning beam of light emanating from the phosphor screen 54 energizes the photoconductive layer 14 and changes the conductivity of elemental regions thereof. Thus the voltage across each elemental region of the electroluminescent layer 12 varies as does the light output therefrom. Half-tone pictures may be stored by employing the devices shown in FIGS. 5 and 7.

The devices described above may also be employed for the production of color pictures. Several forms of electroluminescent devices suitable for this purpose are shown in FIGS. 10 and 11. The devices are divided, in one way or another, into sub-elemental regions each of which is considerably smaller than a picture element. The individual regions are arranged in the desired sequence and each region is sensitive to only one color or frequency range of incident light and in turn produces a particular color of electroluminescent light. The desired sub-elemental regions may be obtained by subdividing photoconductors into sub-elemental regions having appropriate color response, or with photoconductors and electroluminescent phosphors having "white" response in combination with suitable filters, or by any combination of these.

For example, in FIG. 10, an electroluminescent device 56 comprises the same basic components as the device of FIG. 1 and including a photoconductive layer 57, an electroluminescent layer 59 and color filters 58 and 60 mounted on the free surfaces of each of the glass sheets 30, 20 respectively. Each filter comprises registered repeating series of sub-elemental units R, B, G sensitive to different colors of light for example, red, blue and green. The operation of such a device is clear from the description of the devices described above.

In FIG. 11, an electroluminescent device 62 has a photoconductive layer 64 which is constituted of repeating sub elemental regions R', B', G', each of which has the desired color response. For example, solid antimony trisulfide have substantially a red response, lead iodide has substantially a green response and selenium has substantially a blue response. The layer 64 is mounted in combination with the electroluminescent sheet 59 having substantially a "white" light emission. The color filter 58 is mounted on the glass sheet 30 with its units R, B, G in registry with the corresponding color regions R', B', G' of the photoconductor 64.

The color sandwiches 56, 62 can be excited by projecting a single color picture thereon or by projecting three pictures each of a different color (corresponding to the color sensitivities of the sandwich elements) and superimposing them on the electroluminescent sheet. Also, a single flying spot tube can be used to excite these devices (all of whose color elements are excited by the single spot) and modulating with video signals the A.-C. voltage across the sandwich. In such an arrangement, the color elements would have to be sufficiently large so that the flying spot would be smaller than a single color element whereby sequential colors would be produced in the output. The use of a flying spot scanner with apparatus employing the principles of this invention is described in a U.S. patent application by Kazan filed concurrently herewith, S.N. 315,695, now Patent No. 2,858,363, granted October 28, 1958.

The principles of this invention may be practiced, as indicated above, with radiation other than light. In other embodiments, the photoconductive layer may be made of material whose impedance varies with infra-red or ultraviolet radiation or the like.

In another embodiment of the invention shown in FIG. 12, an electro-luminescent device 76 is mounted in an envelope 77 of a cathode ray type tube. This embodiment of the invention may be compared in structure and function to a type of storage tube which is described in an article in the RCA Review, volume 9 (1948) pages 112–135. This embodiment represents a further utilization of the invention as a storage device. In this embodiment the electroluminescent device 76 comprises a layer 78 of electroluminescent material having a charge-receiving member or sheet 80 of insulating material such as mica on one face thereof and a transparent conductive signal plate 82 on the other face thereof. A glass base plate 83, which may be the face plate of the envelope, supports the device 76.

The electroluminescent device is thus mounted within the tube envelope 77 with the mica sheet 80 as a target in the path of an electron beam from the usual electron gun 81. Adjacent to the insulating mica layer is positioned a grid 84 which is held at ground or at some small positive potential and acts as a virtual collector for secondary electrons from the target mica sheet. A collector electrode 86 maintained at a comparatively high positive potential for collecting secondary electrons which pass through the screen 84 from the target is mounted within the envelope 77 and is connected outside the tube envelope to a conventional output circuit 88 which may comprise a resistor-condenser network.

The principle of electrostatic storage on an insulating surface has long been known and used in television pick-up tubes, such as the Iconoscope. If an insulating surface is bombarded by an electron beam, the secondary emission ratio will vary with the energy of the bombarding electrons. If the energy is such that the secondary emission ratio is greater than unity, then the potential or charge of the target surface will change with respect to the electrode which collects the secondaries until the net number of secondaries leaving the target surface is exactly equal to the number of primaries arriving there. The surface potential, at which this action takes place, is known as the equilibrium potential. Thus, under steady scanning and with no signal applied to the back plate, the entire surface of the mica is held at a uniform potential, approximately equal to that of the barrier grid 84.

Thus the electron beam acts as a commutator or shorting bar and wherever it strikes, it drives the surface of the mica sheet to approximately barrier grid potential. Then when an input signal is applied to the signal or back plate 82, the potential of that plate moves either in a positive or negative direction, depending on the sign of the signal. The potential of the surface of the mica (at points not bombarded by the electron beam) moves in the same direction due to capacitive coupling with the back plate. When the scanning beam strikes a point on the mica surface, it tends to hold that point at grid potential because of secondary emission with the result that a difference of potential exists across the electroluminescent layer and a burst of light results.

If on successive scans of the electron beam, a new signal is applied to the back plate, electrons will be added to or substracted from the mica 80 and bursts of light will result at points on the electroluminescent layer 78 corresponding to the points on the mica where the electrons were added or substracted.

In another mode of operation of this device, if a high frequency constant amplitude voltage is applied to the back plate and the D.C. current in the scanning beam is varied, such variations will cause corresponding variations in light output. Alternatively, the beam current may be maintained constant and the envelope of the high frequency voltage varied to obtain corresponding variations in light output.

What is claimed is:

1. An electroluminescent device including a layer of photoconductive material, a layer of electroluminescent material in intimate contact with said first named layer, a coating of transparent conductive material on a free surface of said first named layer, a sheet of dielectric material having a regularly varying thickness and mounted on a free surface of said electroluminescent layer, and a film of transparent conductive material on a free surface of said dielectric sheet, said conductive coating and film being adapted to apply an electric field accross said photoconductive and electroluminescent layers.

2. An electroluminescent device including a layer of photoconductive material, a regularly variable density radiation transmitter in intimate contact with one surface of said first named layer, a sheet of electroluminescent material mounted on a free surface of said radiation transmitter, and a coating of transparent conductive material on a free surface of said first named layer and said electroluminescent sheet, said conductive coatings being adapted to apply an electric field across said photoconductive layer and electroluminescent sheet.

3. An electroluminescent device including a sheet of photoconductive material and a sheet of electroluminescent material adjacent to each other along a common surface, a layer of conductive material on a free surface of each of said sheets, and radiation filter means mounted on each of said conductive layers and sensitive to different wavelengths of radiation, said conductive layers being adapted to establish an electric field across said sheets.

4. An electroluminescent device including a sheet of photoconductive material and a sheet of electroluminescent material adjacent to each other along a common surface, a layer of conductive material mounted on a free surface of each of said sheets and adapted to establish an electric field across said sheets, said photoconductive layer comprising a plurality of groups of regularly recurring elements of sub-elemental size sensitive to different wavelengths of radiation, and a radiation filter layer mounted on the free surface of a conductive layer associated with said electroluminescent sheet, said filter layer including a plurality of groups of regularly recurring elements of sub-elemental size sensitive to different wavelengths of radiation, each of the elements of said last named layer being in registry with the corresponding element of said photoconductive layer.

5. An electron tube including an electron gun for producing a beam of electrons; an electroluminescent device, said device including a sheet of insulating material and a sheet of electroluminescent material in contact along a common surface and a layer of transparent conductive material on the free surface of said electroluminescent layer, said device being disposed with an insulating layer in the path of said electron beam; said conductive layer having an external terminal for applying an electrical charge thereto.

6. An electroluminescent device including a sheet of electroluminescent material, a layer of insulating material in contact with one surface of said sheet of electroluminescent material, and a layer of transparent conductive material on a free surface of said electroluminescent layer, means mounted adjacent to one portion of said device for establishing an electric charge thereon, means for applying another electrical charge to said conductive layer, said charges being adapted to affect the electric field across said electroluminescent layer.

7. A dielectric assembly for use in a radiation amplifier comprising two elements of dielectric material in series arrangement, one element including a layer of electroluminescent material, the other element including a plurality of spaced apart masses of photoconductive material, the space between said masses being filled with transparent insulating material, said masses constituting electrically independent impedances each separately in series arrangement with said one element.

8. A dielectric assembly for use in a radiation amplifier comprising two elements of dielectric material in series arrangement, one element including a layer of electroluminescent material, the other element including a transparent layer containing a plurality of spaced apart masses of photoconductive material, said masses constituting electrically independent impedances each separately in series arrangement with said one element.

9. A radiation-handling device comprising two elements of dielectric material electrically in series, one element including a layer of electroluminescent material, the other element including a transparent layer containing a plurality of spaced apart masses of photosensitive material, said photosensitive material having impedance characteristics which vary in response to varying intensity of incident radiation, said masses constituting electrically independent impedances each separately in series arrangement with said one element, and means for applying an electric field in series with said two elements.

10. A radiation-handling device comprising a layer of electroluminescent phosphor material, a voltage-controlling layer electrically in series with said phosphor layer said voltage-controlling layer including a plurality of spaced apart elements of photoconductive material having surfaces exposed to incident radiation, a transparent insulating medium extending through said voltage controlling layer between said elements and means for applying an electric field to said phosphor layer and said elements.

11. A radiation-handling device comprising a layer of electroluminescent phosphor material, a voltage-controlling layer electrically in series with said phosphor layer, said voltage-controlling layer including photoconductive material, said voltage-controlling layer in the absence of light having a predetermined low value of admittance to prevent the phosphor layer from luminescing, said voltage-controlling layer having light-transmissive characteristics permitting incident light to penetrate to a depth which produces a change in said admittance to a degree sufficient to control luminescing of said phosphor layer, and means for applying an electric field to said layers.

12. A radiation-handling device comprising a layer of electroluminescent phosphor material, a voltage-controlling layer electrically in series with said phosphor layer and having a predetermined thickness dimension, said voltage-controlling layer including photoconductive material which extends in the direction of said thickness dimension, said voltage-controlling layer being substantially transparent to incident light to a depth substantially equal to the distance which said photoconductive material extends in the direction of said thickness dimension, and means for applying an electric field to said layers.

13. A radiation-handling device comprising a layer of electroluminescent phosphor material, a voltage-controlling layer electrically in series with said phosphor layer, said voltage-controlling layer including photoconductive material, said photoconductive material comprising a plurality of discrete elements, each element conducting current in a predetermined direction, each element receiving radiation in a direction transverse to said predetermined direction of current flow, and means for applying an electric field to said layers.

14. A radiation-handling device comprising two plate-like electrods, two layers of dielectric material electrically in series between said electrodes, one of said layers including electroluminescent phosphor material and the other layer including photoconductive material, means for preventing lateral conduction in the photoconductive layer, means for preventing luminescence of a given area of the phosphor layer from impinging adjacent laterally spaced areas of said photoconductive layer, and means for applying an electric field to said layers.

15. A radiation amplifier device comprising a sheet of photoconductive material and a sheet of electroluminescent material in contact with each other along a common surface, a layer of conductive material on a free surface of each of said photoconductive and electroluminescent sheets, and a radiation filter layer mounted adjacent to each of said conductive layers for passing radiation of different wavelengths, each of said filter layers comprising a plurality of groups of regularly recurring elements sensitive to different wavelengths of radiation, each element of one filter layer being in register with a like element of the other filter layer, said conductive layers being adapted to establish an electric field across said photoconductive and electroluminescent sheets.

16. Means for intensifying and reproducing a radiant image in color, comprising the combination of a first stratum comprising a registering system of successive filter strips each responsive to radiant energy in a different wavelength determinative of a particular color, a second stratum of material, the electric impedance of which is subject to change by radiant energy excitation of said first stratum, a third stratum of electroluminescent material next adjacent said second stratum, means for supporting said respective strata in adjacent relation, and means for impressing an electric field across both the second stratum and the third stratum.

17. Means for intensifying and reproducing a radiant image in color, comprising the combination of a first stratum comprising a plurality of groups of regularly recurring filter strips each responsive to radiant energy in a different wavelength determinative of a particular color, a second stratum of material, the electric impedance of which is subject to change by radiant energy excitation of said first stratum, a third stratum of electroluminescent material in contact with said second stratum along a common surface, a fourth stratum comprising a plurality of groups of regularly recurring filter strips each responsive to radiant energy in a different wavelength determinative of a particular color adjacent to said third stratum, with the strips of the fourth stratum registering with filter strips responsive to the same color in the first stratum, means for supporting said respective strata in adjacent relation, and means for impressing an electric field across both said second stratum and said third stratum.

18. A radiation amplifying device comprising radiation-responsive means including a photoconductive layer, radiation-emissive means including an electroluminescent layer in contact with said photoconductive layer, and electrode means adapted to establish an electric field across said layers, said radiation-responsive means comprising a plurality of groups of regularly recurring elemental radiation-responsive regions sensitive to different wavelengths of radiation, said radiation-emissive means comprising a plurality of groups of regularly recurring elemental radiation-emissive regions effectively luminescent in different wavelengths of radiation, each elemental region of said radiation-emissive means luminescent in a given wavelength being in register with an elemental region of said radiation-responsive means sensitive to the same wavelength of radiation.

19. A radiation amplifying device as in claim 18, wherein said second-named plurality of groups of elemental regions is constituted by said electroluminescent layer and a layer of radiation filter elements mounted adjacent to said electroluminescent layer.

20. A frequency responsive circuit comprising a pair of input terminals, an electroluminescent cell and a photoconductive variable impedance circuit element connected in electrical circuit relationship between said terminals, and means connected to said terminals and impressing an alternating voltage across said variable impedance element and said electroluminescent cell.

References Cited by the Examiner
UNITED STATES PATENTS

| | | | |
|---|---|---|---|
| 2,409,454 | 10/1946 | Thomas | 250—213 X |
| 2,525,832 | 10/1950 | Sheldon | 250—71 X |
| 2,535,817 | 12/1950 | Skellett | 250—213 X |
| 2,566,349 | 9/1951 | Mager | 250—71 X |
| 2,603,757 | 7/1952 | Sheldon | 250—80 X |
| 2,650,310 | 8/1953 | White | 250—71 |
| 2,692,948 | 10/1954 | Lion | 250—65 |

OTHER REFERENCES

Bramley et al.: Physical Review, vol 87, No. 6, Sept. 15, 1952, page 1125.

Destriau: The Philosophical Magazine, Seventh Series, October 1947, vol. 38, pp. 700 to 730.

Ivey: Electroluminescence and Related effects, Supplement 1, 1963, Academic Press.

Luyckx et al.: British Journal of Applied Physics, Supplement No. 4, page 57 (1955).

RALPH G. NILSON, *Primary Examiner.*

ELI J. SAX, *Examiner.*